(12) United States Patent
Randolph

(10) Patent No.: US 7,464,415 B2
(45) Date of Patent: Dec. 16, 2008

(54) AUTOMATIC CUT-OFF VALVE

(76) Inventor: Ovie L. Randolph, 2513 Briarcliff, Irving, TX (US) 75062

( * ) Notice: Subject to any disclaimer, the term of this patent is extended or adjusted under 35 U.S.C. 154(b) by 591 days.

(21) Appl. No.: 11/036,078

(22) Filed: Jan. 13, 2005

(65) Prior Publication Data

US 2006/0150307 A1    Jul. 13, 2006

(51) Int. Cl.
*E03D 1/36* (2006.01)
(52) U.S. Cl. .......................... 4/366; 137/426
(58) Field of Classification Search .......... 4/353, 4/366, 367, 383, 381, 382, 391, 395; 137/329.3, 137/315, 400, 426, 446, 449
See application file for complete search history.

(56) References Cited

U.S. PATENT DOCUMENTS 3,727,243 A * 4/1973 Biniores ................... 4/353
5,230,104 A * 7/1993 Ocampo .................. 4/367

5,878,775 A    3/1999 Tamburro, Jr.

* cited by examiner

*Primary Examiner*—Tuan N Nguyen
(74) *Attorney, Agent, or Firm*—W. Thomas Timmons

(57) ABSTRACT

A supplemental fill valve for use in a toilet tank, to work in conjunction with a flapper and a typical fill valve having a float cup and a valve body, includes a supplemental float cup forming a recess and at least one opening in the bottom thereof, a vertical member installed through the recess, on which the supplemental float cup freely moves up and down, and a coil spring placed between the top of the vertical member and the top inside of the supplemental float cup. A lifting member extending from the supplemental float cup to the float cup, preferably under the float cup, lifts the float cup. An alternative supplemental fill valve includes a weighted supplemental float cup, and a lifting cam activated by the weighted supplemental float cup, extending from the supplemental float cup to the float cup for lifting the float cup, wherein when water flows out of the tank, the weighted float cup activates the cam, lifting the float cup. The weighted supplemental float cup rides up and down in a guide, which is affixed to the side of the main valve body.

2 Claims, 6 Drawing Sheets

AUTOMATIC CUT-OFF VALVE

CROSS-REFERENCE TO RELATED APPLICATIONS

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates generally to the inlet or fill valve for a toilet tank and in one of its aspects to an automatic cut-off to prevent continual running of water.

2. Description of Related Art

If a tank ball or flap fails to properly seat after a toilet has been flushed, then water will continue to flow into the tank and out through the valve seat, wasting water. If someone is nearby and hears the water running, then that person can manually shut off the water or try to get the ball or flap to properly seat.

BRIEF SUMMARY OF THE INVENTION

A fill valve according to the present invention, for use in a toilet tank, to work in conjunction with a flapper, includes a float cup forming a recess and at least one opening in the bottom thereof, a valve body installed through the recess, on which the float cup freely moves up and down, and a coil spring placed between the top of the valve body and the top inside of the float cup. The coil spring exerts upward pressure from the top of the valve body against the top of the float cup. The float cup fills at least partially with water taken in through the at least one opening in the bottom. When the flapper is lifted and water flows out of the tank, the float cup moves down the valve body until the spring is substantially compressed. When the water has substantially drained from the tank, then the water that at least partially filled the float cup runs out of the float cup through the at least one opening in the bottom, and the spring returns the float cup to the upper position. In this way, should the flapper fail to return to the closed position, the valve will automatically cut-off so that water will not continue to run.

A supplemental fill valve for use in a toilet tank, to work in conjunction with a flapper and a typical fill valve having a float cup and a valve body, includes a supplemental float cup forming a recess and at least one opening in the bottom thereof, a vertical member installed through the recess, on which the supplemental float cup freely moves up and down, and a coil spring placed between the top of the vertical member and the top inside of the supplemental float cup. The coil spring exerts upward pressure from the top of the valve body against the top of the float cup. The float cup fills at least partially with water taken in through the at least one opening in the bottom. When the flapper is lifted and water flows out of the tank, the float cup moves down the valve body until the spring is substantially compressed. Once the water has drained from the tank, then the water that at least partially filled the float cup runs out of the float cup through the at least one opening in the bottom and the spring returns the float cup to the upper position. A lifting member extending from the supplemental float cup to the float cup, preferably under the float cup, lifts the float cup. Such a supplemental fill valve can be used to retrofit existing units.

An alternative supplemental fill valve for use in a toilet tank is to work in conjunction with a flapper and a typical fill valve having a float cup and a valve body. This supplemental fill valve includes a weighted supplemental float cup, and a lifting cam activated by the weighted supplemental float cup, extending from the supplemental float cup to the float cup for lifting the float cup, wherein when water flows out of the tank, the weighted float cup activates the cam, lifting the float cup. The weighted supplemental float cup rides up and down in a guide which is affixed to the side of the main valve body. The guide also supports the cam.

These and other objects, advantages and features of this invention will be apparent from the following description taken with reference to the accompanying drawing, wherein is shown a preferred embodiment of the invention.

DETAILED DESCRIPTION OF THE INVENTION

Figure 1:
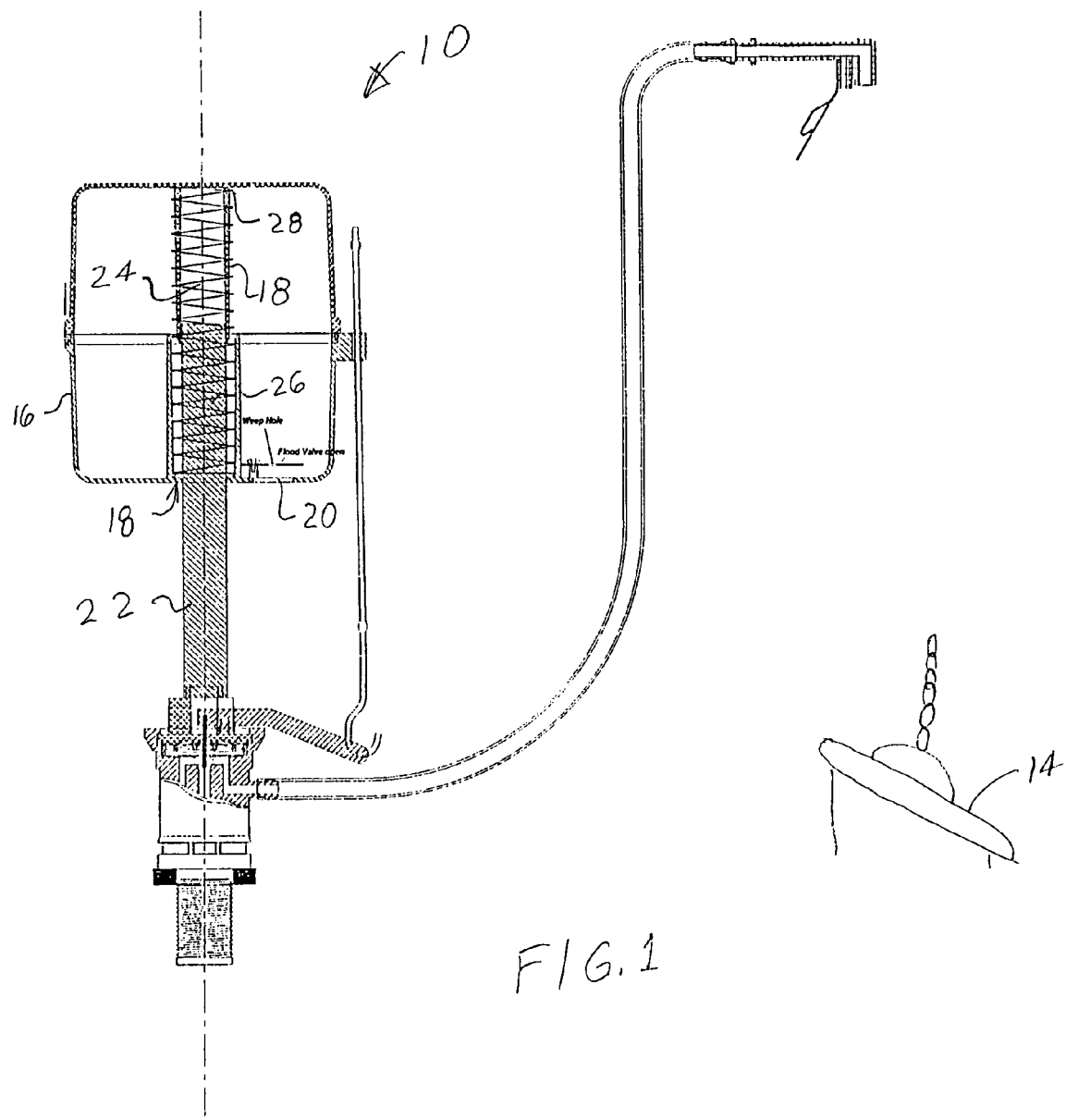
FIG. 1 is a toilet tank assembly according to the present invention.

Referring now to the drawing, and in particular to FIG. 1, a fill valve according to the present invention, for use in a toilet tank 12, is referred to generally by reference numeral 10. Fill valve 10 is intended to work in conjunction with a flapper 14, includes a float cup 16 forming a recess 18 and at least one opening 20 in the bottom thereof, a valve body 22 installed through the recess, on which the float cup freely moves up and down, and a coil spring 24 placed between the top 26 of the valve body and the top 28 inside of the float cup. The coil spring exerts upward pressure from the top of the valve body against the top of the float cup. The float cup fills at least partially with water taken in through the at least one opening in the bottom. When the flapper is lifted and water flows out of the tank, the float cup moves down the valve body until the spring is substantially compressed. When the water has substantially drained from the tank, then the water that at least partially filled the float cup runs out of the float cup through the at least one opening in the bottom, and the spring returns the float cup to the upper position. In this way, should the flapper fail to return to the closed position, the valve will automatically cut-off so that water will not continue to run.

Figure 2:
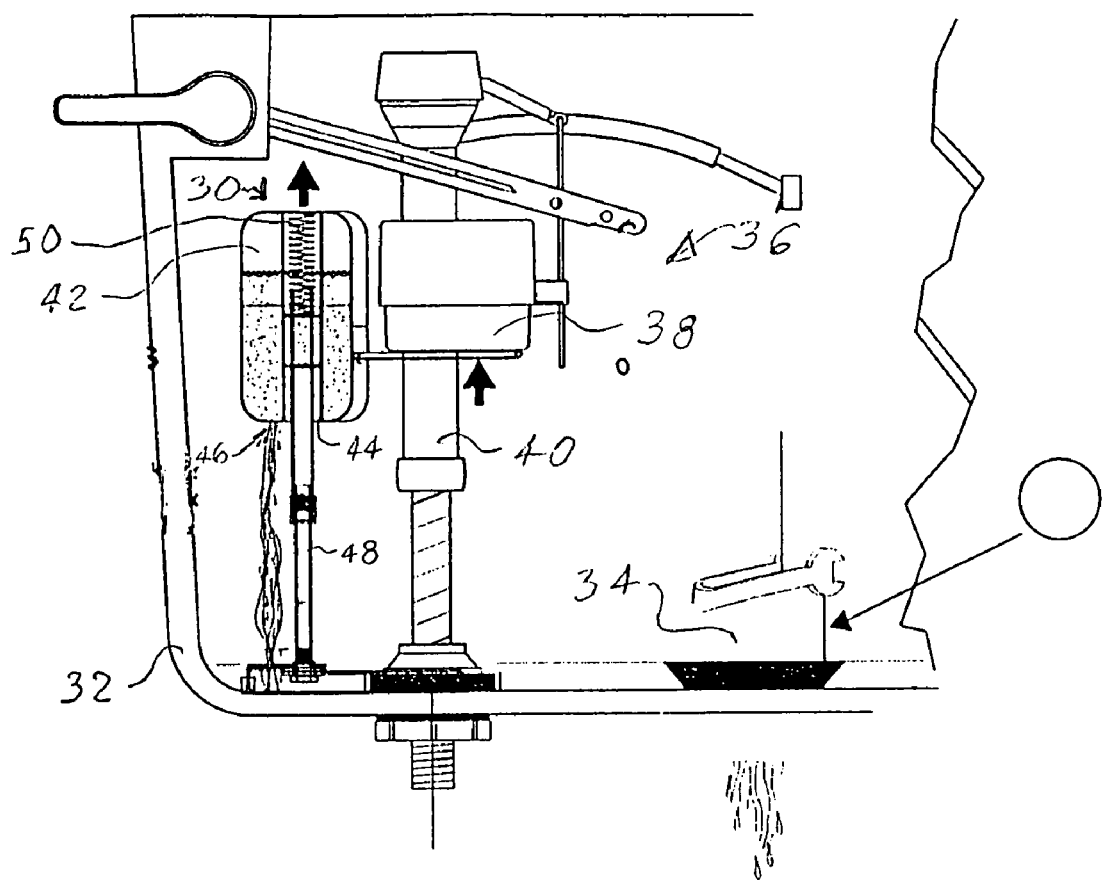
FIG. 2 is an alternative toilet tank assembly according to the present invention for retrofit into a tank assembly according to the prior art.

Referring now to FIG. 2, a supplemental fill valve according to the present invention is referred to generally by reference numeral 30 for use in a toilet tank 32, to work in conjunction with a flapper 34 and a typical fill valve 36 having a float cup 38 and a valve body 40, includes a supplemental float cup 42 forming a recess 44 and at least one opening 46 in the bottom thereof, a vertical member 48 installed through the recess, on which the supplemental float cup freely moves up and down, and a coil spring 50 placed between the top of the vertical member and the top inside of the supplemental float cup. Coil spring 50 exerts upward pressure from the top of the valve body against the top of the float cup. The float cup fills at least partially with water taken in through the at least one opening in the bottom. When the flapper is lifted and water flows out of the tank, the float cup moves down the valve body until the spring is substantially compressed. Once the water has drained from the tank, then the water that at least partially filled the float cup runs out of the float cup through the at least one opening in the bottom and the spring returns the float cup to the upper position. A lifting member extending from the supplemental float cup to the float cup, preferably under the float cup, lifts the float cup. Such a supplemental fill valve can be used to retrofit existing units.

Figure 3:
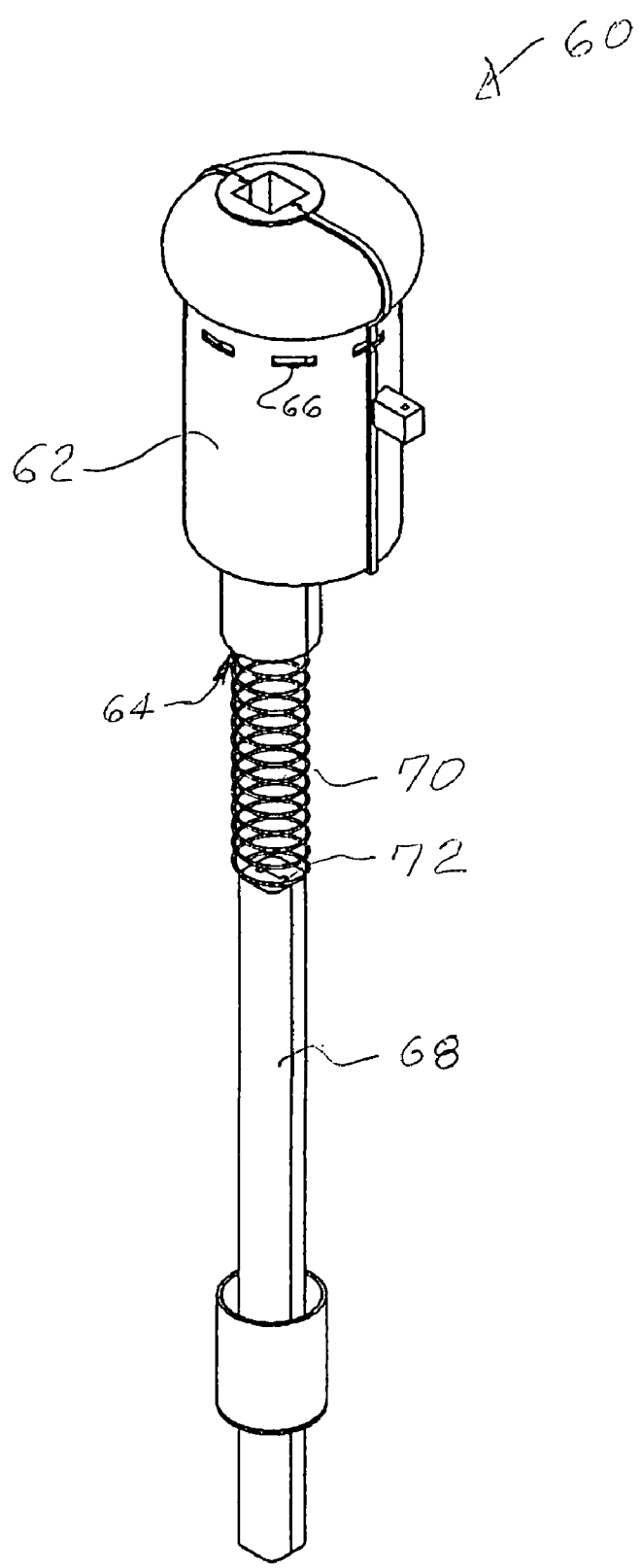
FIG. 3 is a partially exploded view of an alternative embodiment of the fill valve of the tank assembly of FIG. 1.
Figure 4:
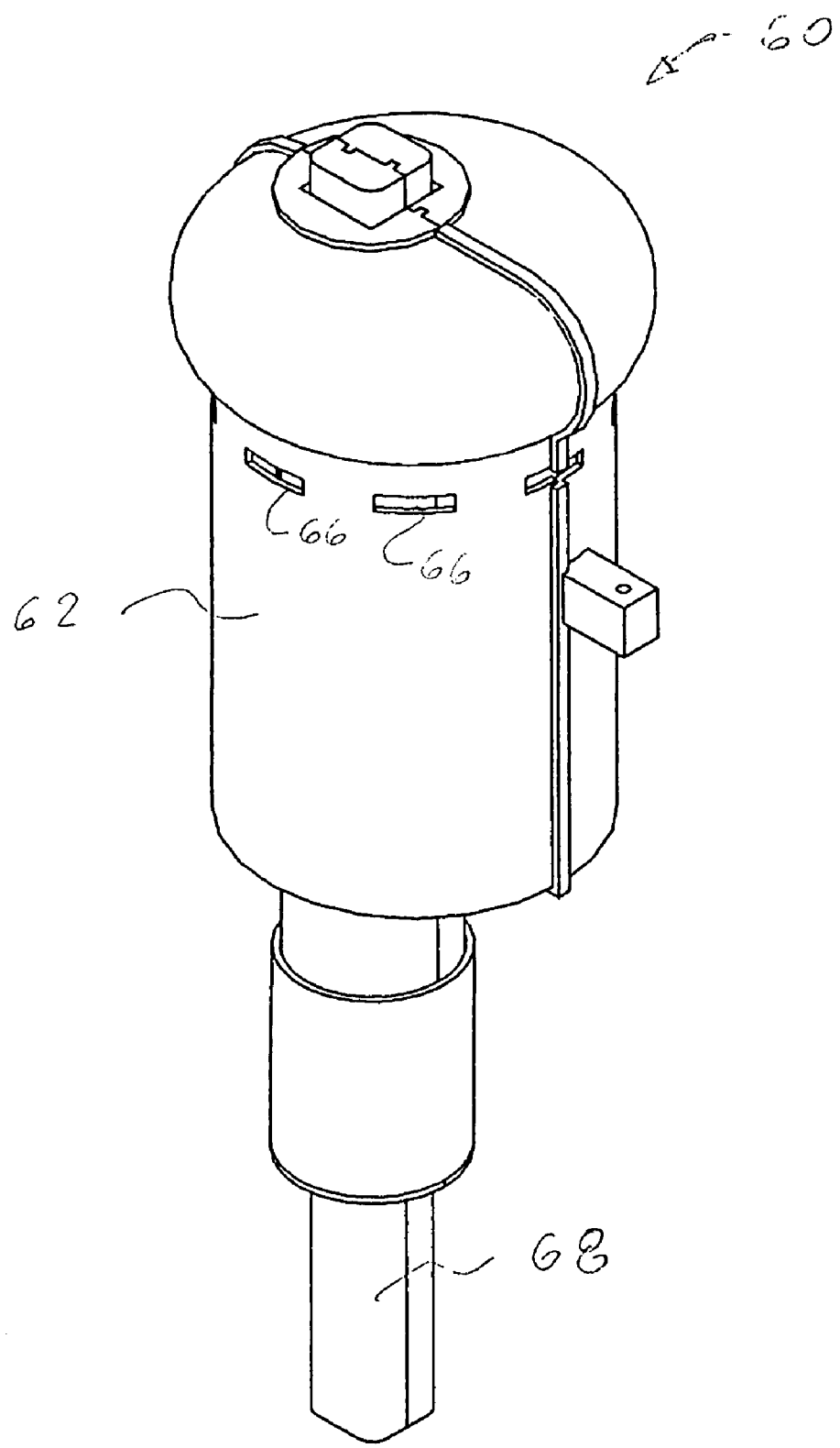
FIG. 4 is a non-exploded view of the fill valve of FIG. 3.

Referring now to FIG. 3 and FIG. 4, an alternative embodiment to that shown in FIG. 1 is referred to generally by reference numeral 60. Fill valve 60 is intended to work in conjunction with a flapper, includes a float cup 62 forming a recess 64 and at least one opening in or near the bottom thereof and at least one opening 66 at or near the top, a valve body 68 installed through the recess, on which the float cup freely moves up and down, and a coil spring 70 is placed between the top 72 of the valve body and the top inside of the float cup. The coil spring exerts upward pressure from the top of the valve body against the top of the float cup. The float cup fills at least partially with water taken in through the at least one opening at or near the top. When the flapper is lifted and water flows out of the tank, the float cup moves down the valve body until the spring is substantially compressed. When the water has substantially drained from the tank, then the water that at least partially filled the float cup runs out of the float cup through the at least one opening in or near the bottom, and the spring returns the float cup to the upper position. In this way, should the flapper fail to return to the closed position, the valve will automatically cut-off so that water will not continue to run.

Figure 5:
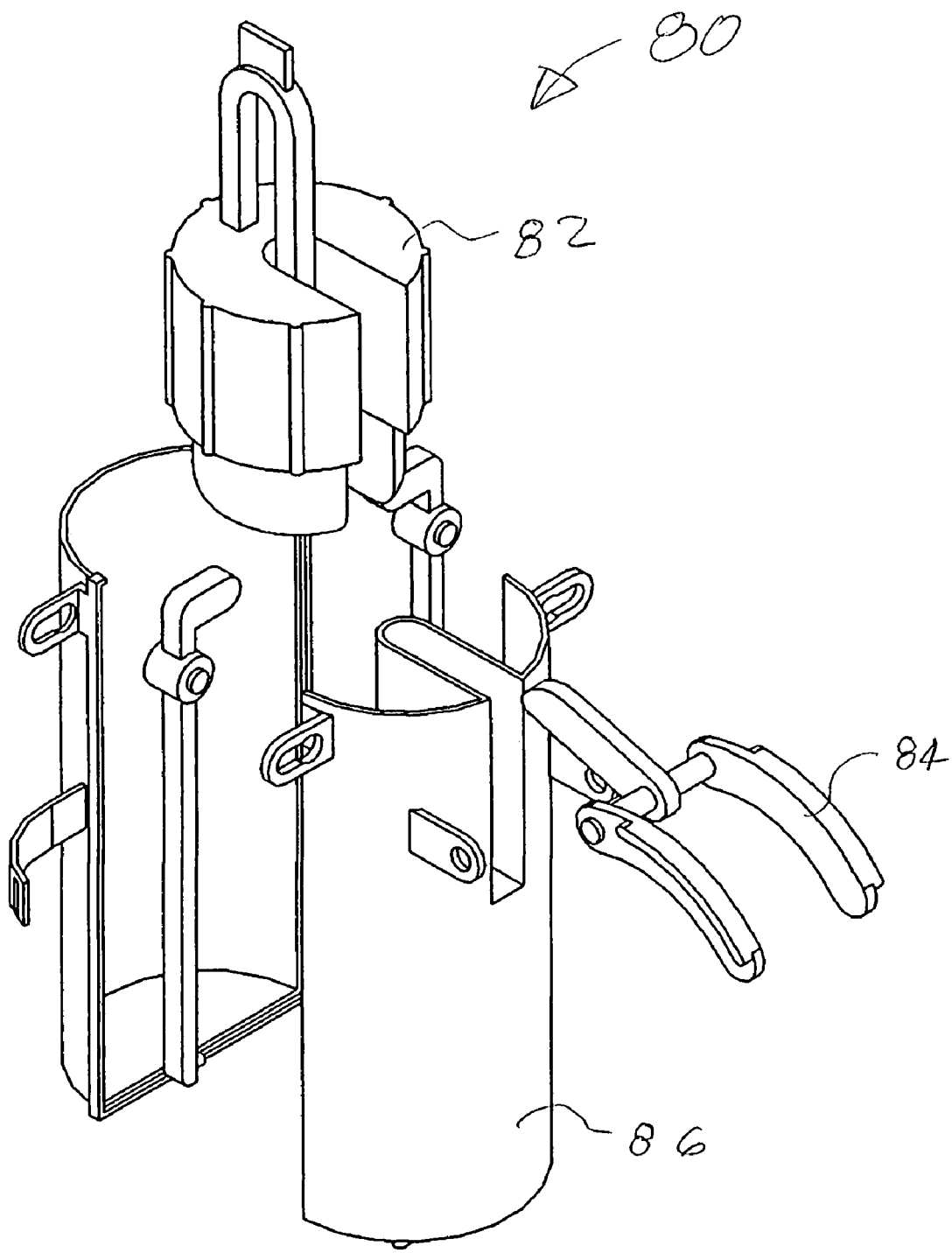
FIG. 5 is an exploded view of an alternative embodiment of an supplemental fill valve of the tank assembly of FIG. 2.
Figure 6:
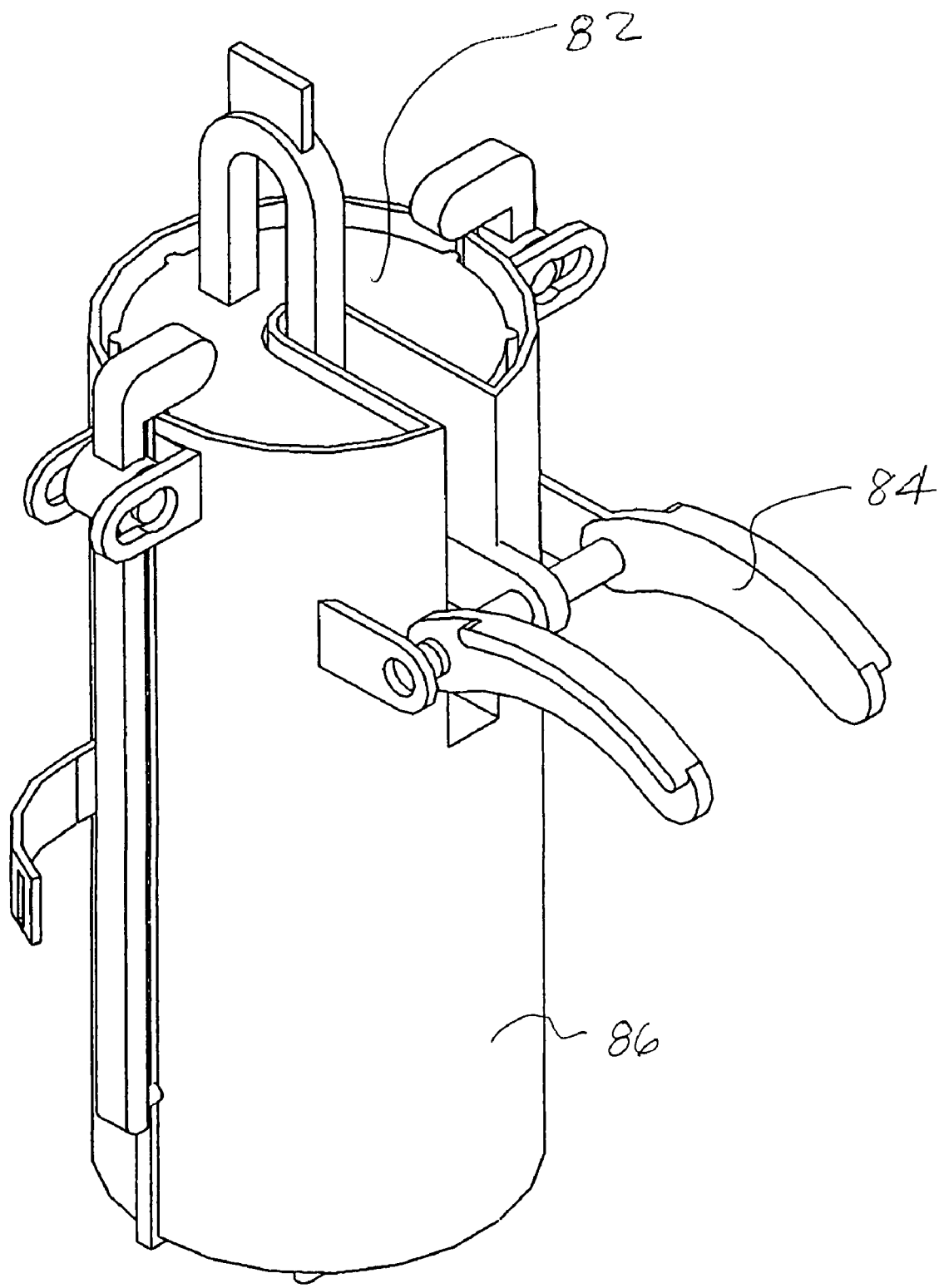
FIG. 6 is a non-exploded view of the supplemental fill valve of FIG. 5.

Referring now to FIG. 5 and FIG. 6, a supplemental fill valve for use in a toilet tank is referred to generally by reference numeral 80 is to work in conjunction with a flapper and a typical fill valve having a float cup and a valve body. Supplemental fill valve 80 comprises a weighted supplemental float cup 82, and a lifting cam 84 activated by the weighted supplemental float cup, extending from the supplemental float cup to the float cup for lifting the float cup, wherein when water flows out of the tank, the weighted float cup activates the cam, lifting the float cup. Weighted supplemental float cup 82 rides up and down in a guide 86 which is affixed to the side of the main valve body. Guide 86 also supports cam 84.

From the foregoing it will be seen that this invention is well adapted to attain all of the ends and objectives hereinabove set forth, together with other advantages which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the figures of the accompanying drawings is to be interpreted as illustrative and not in a limiting sense.

The invention claimed is:

1. A supplemental fill valve for use in a toilet tank, to work in conjunction with a flapper and a typical fill valve having a float cup and a valve body, comprising in combination:

a supplemental float cup forming a recess and at least one opening therein;

a vertical member installed through the recess, on which the supplemental float cup freely moves up and down; and a coil spring placed between the top of the vertical member and the top inside of the supplemental float cup, wherein the coil spring exerts upward pressure from the top of the valve body against the top of the float cup, wherein the float cup fills at least partially with water taken in through the at least one opening, and wherein when the flapper is lifted and water flows out of the tank, the float cup moves down the valve body until the spring is substantially compressed, and wherein when the water that at least partially filled the float cup runs out of the float cup through the at least one opening, the spring returns the float cup to the upper position; and a lifting member extending from the supplemental float cup to the float cup for lifting the float cup.

2. A supplemental fill valve according to claim 1, wherein the at least one opening in the supplemental float cup comprises at least one opening on or near the bottom of the supplemental float cup and at least one opening at or near the top of the supplemental float cup.

\* \* \* \* \*